(12) United States Patent
Gieseke

(10) Patent No.: US 12,269,131 B1
(45) Date of Patent: Apr. 8, 2025

(54) NONLINEAR BULK MODULUS MATERIAL

(71) Applicant: The United States of America as represented by the Secretary of the Navy, Newport, RI (US)

(72) Inventor: Thomas J Gieseke, Dighton, MA (US)

(73) Assignee: The United States of America as represented by the Secretary of the Navy

( * ) Notice: Subject to any disclaimer, the term of this patent is extended or adjusted under 35 U.S.C. 154(b) by 759 days.

(21) Appl. No.: 17/573,733

(22) Filed: Jan. 12, 2022

(51) Int. Cl.
*B23K 9/028* (2006.01)
*B21D 41/04* (2006.01)
*B23P 23/04* (2006.01)

(52) U.S. Cl.
CPC ............ *B23K 9/0282* (2013.01); *B21D 41/04* (2013.01); *B23P 23/04* (2013.01)

(58) Field of Classification Search
CPC ........ B23K 9/0282; B21D 41/04; B23P 23/04
See application file for complete search history.

(56) References Cited

U.S. PATENT DOCUMENTS

2004/0194347 A1* 10/2004 Aveni .................. A43B 7/1464
36/91

\* cited by examiner

*Primary Examiner* — Robert G Bachner
(74) *Attorney, Agent, or Firm* — James M. Kasischke; Michael P. Stanley; Jeffry C. Severson

(57) ABSTRACT

Particles are provided which have a bulk modulus that varies nonlinearly with changes in pressure. The shell having a shell and a core is manufactured from a solid elastic material as a tube shape with a closure at both ends. The core is manufactured from a material having a bulk modulus less than the bulk modulus of the shell material and is pressurized. A system for fabricating the particles operationally includes a first pair of crimping wheels, a second pair of crimping wheels, and a pair of cutting wheels. During manufacture, feed stock is fed along a central line of symmetry; first passing between the first pair of crimping wheels, between the second pair of crimping wheels, and then between the cutting wheels. Particles are created by crimping, sealing and cutting sections of the feed stock to form individual or strings of particles.

7 Claims, 17 Drawing Sheets

NONLINEAR BULK MODULUS MATERIAL

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to a material additive having a nonlinear bulk modulus.

(2) Description of the Related Art

In the field of mechanical engineering, there exists a need for materials having nonlinear properties. The bulk modulus of a material is the ability to resist deformation under pressure (expressed as a rate of pressure change per unit of volumetric strain). A soft material has a low bulk modulus and a stiff material has a high bulk modulus.

Elastomers have a nonlinear bulk modulus where the elastomers become stiffer when strained, herein referred to as a stiffening material. There are no known materials, that over a broad range of operating conditions, become softer when strained, herein referred to as a softening material.

Bulk modulus is the resistance of a material to volumetric change in response to applied pressure. Also, bulk modulus is the volumetric analogue to a linear spring constant. The macro bulk modulus behavior of a composite material can be assessed as if the composite material includes an array of interconnected springs with each of the springs having a different spring constant.

In the manufacture of springs, it is desirable to produce a spring with a nonlinear spring constant such that the spring will deform at a small amount under a large load yet have a relatively low spring constant with incremental loading while subjected to a large load. An automotive or truck suspension spring with these characteristics produces a smooth ride while under a heavy load. A spring-like feature manufactured from a softening material that has a decreasing bulk modulus with increased load is therefore desirable.

When materials are placed in layers, the aggregate elastic behavior of the layers are governed by the softest layer in the series. A composite structure having a stiff binder and a sparse distribution of soft additive behaves as though there were no soft additive at all. This is because the net behavior depends on the geometry of the additive distribution within the binder matrix.

A gasket material under a high load will experience stress concentrations in the location of surface imperfections. Such stress concentrations can lead to a mechanical failure of the gasket. A gasket manufactured from a softening material is less susceptible to failure at stress concentration points.

In hybrid cases, where the soft additive is a large volume fraction of aggregate material; the composite will have a net behavior with properties between those of the matrix of a stiff binder surrounding the additive and the soft additive itself.

Composite manufacturing techniques are well-known fabricating structures with favorable properties at the macroscale when combining materials with disparate properties at the micro-scale. Fiberglass composites are a well-known example that uses this manufacturing approach. For fiberglass, glass fibers are embedded in resin matrix binder. The resin provides fiber adhesion and is strong in compression.

However, many resins are brittle in tension. Glass fibers embedded in a resin provide high tensile strength for what would otherwise be a brittle material. The elements of a composite includes one or more substances with good compressive and tensile strength and a matrix binder possessing complimentary mechanical properties to adhere the substances together.

Based on the material of the prior art, a substance is needed that has a material property of a nonlinear bulk modulus wherein the bulk modulus decreases under a compressive load. Furthermore, when employed with a matrix binder; the resulting composite material can be formable into blocks, sheets, cylinders, and similar geometric forms.

SUMMARY OF THE INVENTION

It is therefore a general purpose and primary object of the present invention to provide a substance and a system for producing the substance in which the substance has a nonlinear bulk modulus that can decrease under a compressive load. The substance would have tubes that nonlinearly compress under pressure while suspended in a stiff binder; resulting, in a nonlinear bulk modulus property.

It is therefore a further object of the present invention to provide a material additive with a nonlinear bulk modulus for use in composite materials.

To attain the objects of the invention, a particle is provided with a shell and a core. A system is also provided for producing the particle with the shell from a solid elastic material and as a tube shape with a closure at both ends. The tube shaped shell has a wall with circumferentially varying thickness defined by an inner surface and an outer surface. The wall thickness varies from a minimal thickness to maximum thickness in circumferential quadrants, with the ratio of minimum thickness to maximum thickness less than 1 and greater than 0.

The core is the entirety of a closed volume defined by the inner surface of the shell. The core is pressurized and manufactured from a material having a bulk modulus less than the bulk modulus of the shell material and can be a liquid, solid, or gas.

The system for fabricating particles having a bulk modulus includes a first pair of crimping wheels, a second pair of crimping wheels, and a pair of cutting wheels, with each wheel having a center of rotation and a means for rotation. The crimping wheels include radial protrusions equally spaced around the circumference of each crimping wheel and a welder on each protrusion.

The cutting wheels include a plurality of cutting knives equally spaced around the circumference of the wheel. The means of rotation for the wheels independently controls the rotational speed and angle for each wheel. The feed stock, produced from an annular extruder or provided from a supply system, is fed along a central line of symmetry. The feed stock passes between the first pair of crimping wheels, between the second pair of crimping wheels, and then between the cutting wheels. Particles are created by crimping, sealing (by welding), and cutting sections of the feed stock to form individual or strings of particles.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

The present invention is in a general category of articles of manufacture of material additives; the suspension of which in a matrix binder produces unique and useful aggregate material properties. The material property of the present invention is a nonlinear bulk modulus and specifically a bulk modulus that decreases with increasing pressure.

Figure 1:
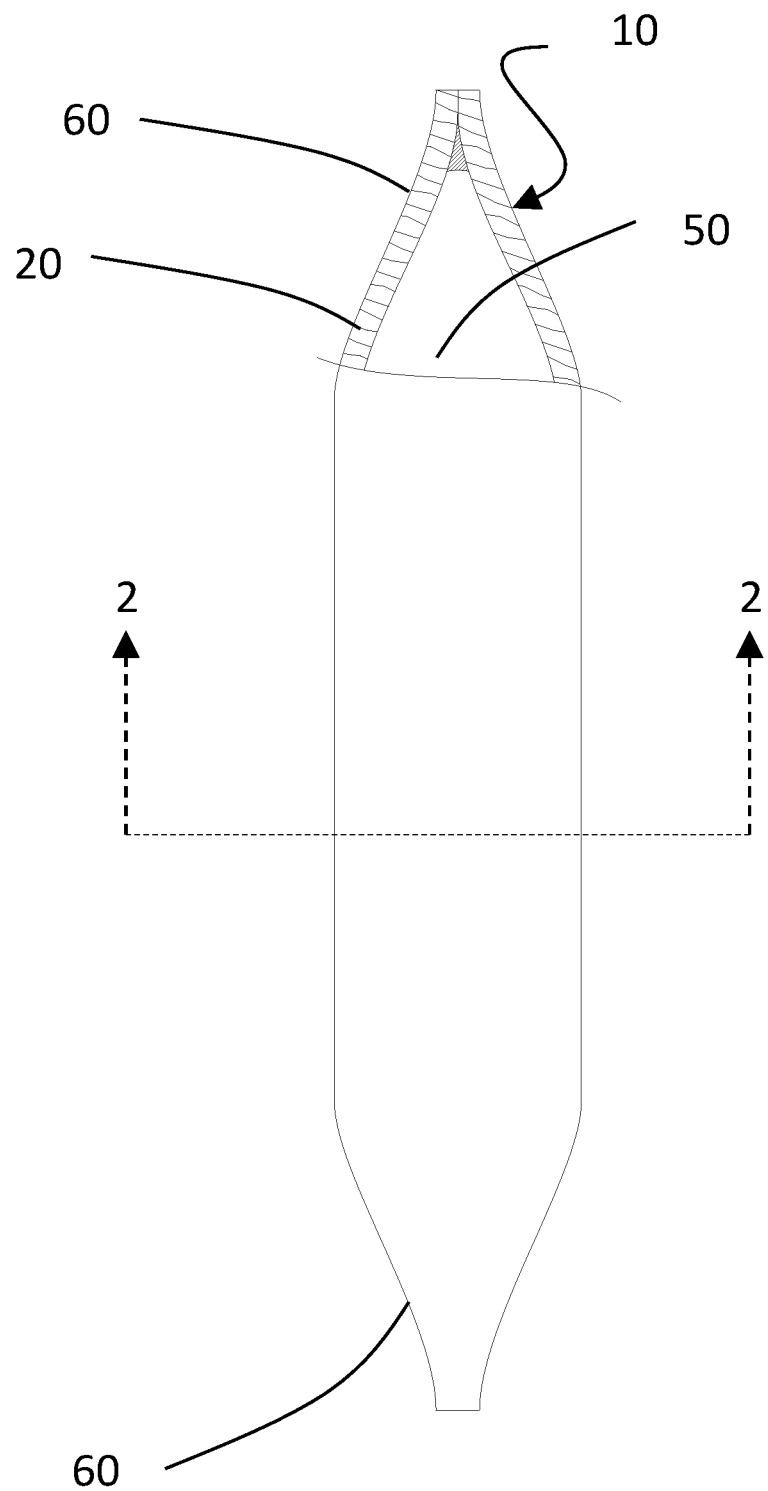
FIG. 1 depicts a longitudinal view and partial cross-section of a nonlinear bulk modulus material particle of the present invention.

FIG. 1 depicts a particle 10 of the present invention in which the particle has a nonlinear bulk modulus. The particle 10 is a shell 20, manufactured from a first material (a shell material 22 identified in FIG. 7) with a core 50, manufactured from a second material (a core material 52 also identified in FIG. 7). The particle 10 has closed ends 60.

The shell material 22 is an elastic solid having a known tensile strength and bulk modulus. The core material 52 is a material (solid, liquid, or gas) having a low tensile strength and low bulk modulus relative to the shell material.

The particle 10 realizes nonlinear bulk modulus behavior through the combined effect of shaping of the particle shell 20 and pre-stressing of the shell prior to use as an additive by pressurization of the core 50. The pressurization of the core 50 is established when the particle 10 is exposed to ambient pressure. The pressurization of the core 50 is higher than the ambient pressure and lower than the operating pressure with the ratio of operating pressure to core pressurization of less than 1 and the ratio of ambient pressure to core pressurization of greater than 1.

There are three particle pressurization states that realize nonlinear bulk modulus properties for the particle.

Figure 2:
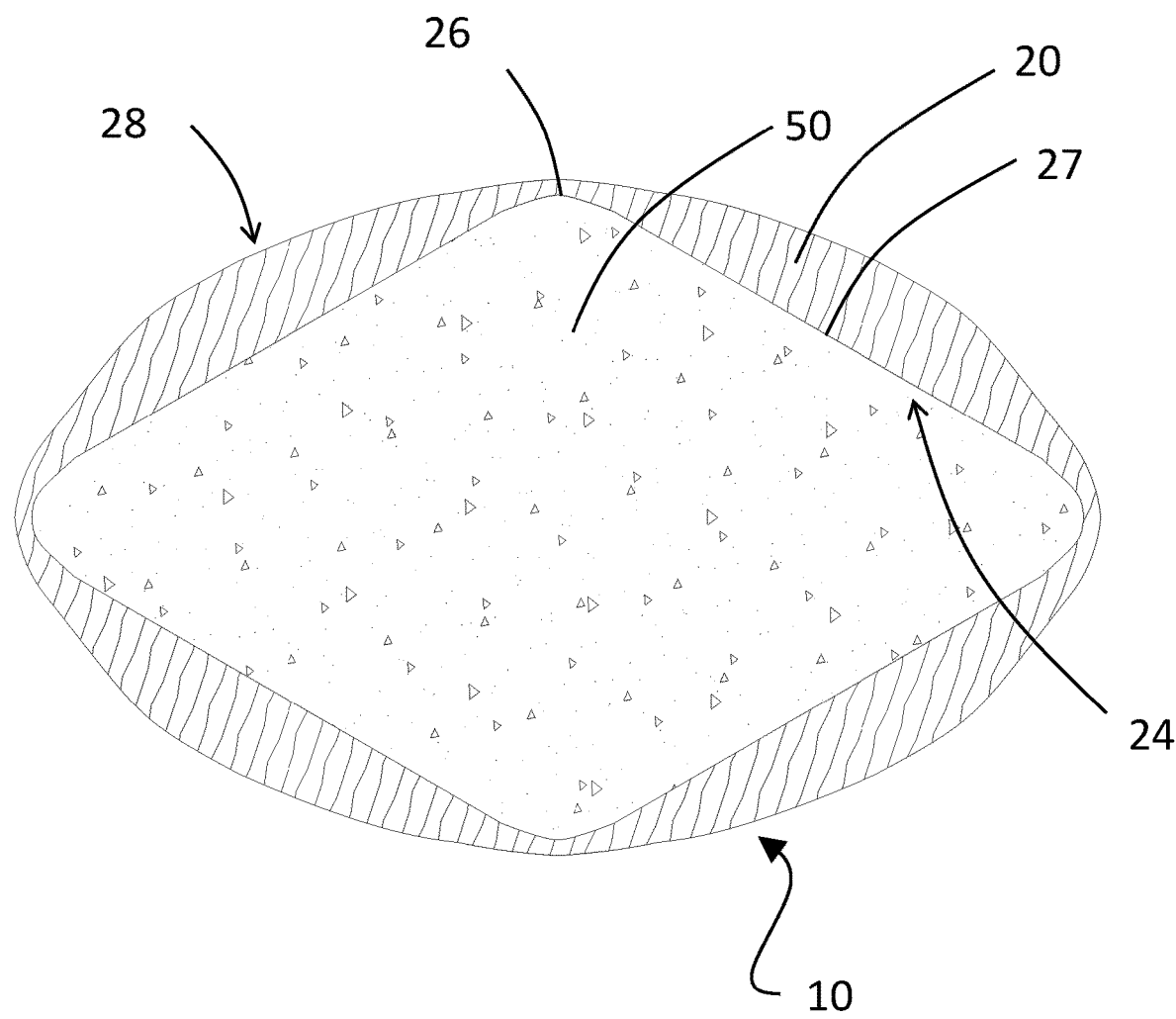
FIG. 2 depicts a cross sectional view of the particles.

In a first particle pressurization state, the shell 20 is unstressed with the core pressure and the external pressure being equal. FIG. 2 depicts a cross section of the particle 10 at a longitudinal midpoint when the particle is in the first pressurization state. The shell 20 has an internal profile 24 that is nominally a rhombus with filleted corners 26 and straight sides 27.

The shell 20 has an external profile 28 which is nominally elliptical such that the shell thickness is smaller near the filleted corners 26 and thicker along the straight sides 27 of the internal profile 24. In this unstressed state, there are no compressive, tensile or bending stresses in the shell 20 or the core 50.

Figure 3:
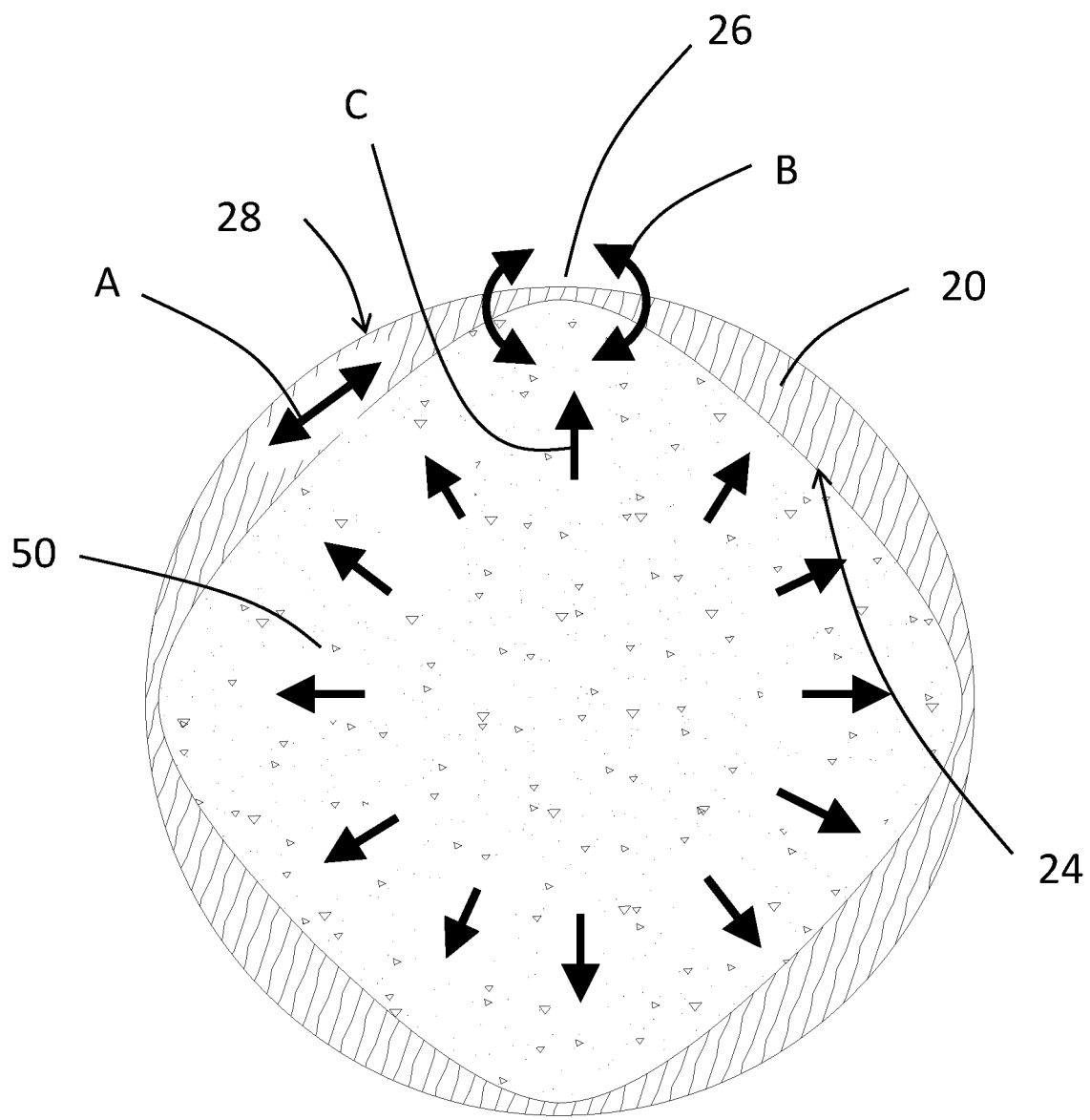
FIG. 3 depicts a cross sectional view of the particle in a first pressurization state.

The second particle pressurization state is a condition at the end of the manufacturing process in which the core material 52 is pressurized. FIG. 3 depicts a cross section of the nonlinear bulk modulus particle 10 at a longitudinal midpoint when the particle is pressurized. The shell 20, the associated shell internal profile 24 and the external profile 28 deform in response to pressurization of the core 50.

Hoop tensile stress "A" (depicted as straight double-headed arrows in FIG. 3) develops along the circumference of the shell 20 and bending stresses "B" (depicted as pairs of double headed curved arrows in FIG. 3) develop throughout the shell, with the largest bending stresses near the filleted corners 26 where the shell is thinnest. As internal pressure "C", depicted in FIG. 3 as outward arrows, is gradually increased from atmospheric; the expansion of the shell 20 is initially resisted by the bending stresses "B" as the shell structure deforms from the internal profile 24 shape (shown in FIG. 2) to the internal profile shape shown in FIG. 3.

As the shell 20 approaches a shape shown in FIG. 3 during pressurization; further deformation is resisted by the hoop tensile stresses "A". The pressure "C" can be increased until a desired pre-pressurization level is achieved. During pre-pressurization, the core 50 is compressed. Once the pre-pressurization level is realized; the particle 10 is in a post manufacture pre-pressurized state.

Figure 4:
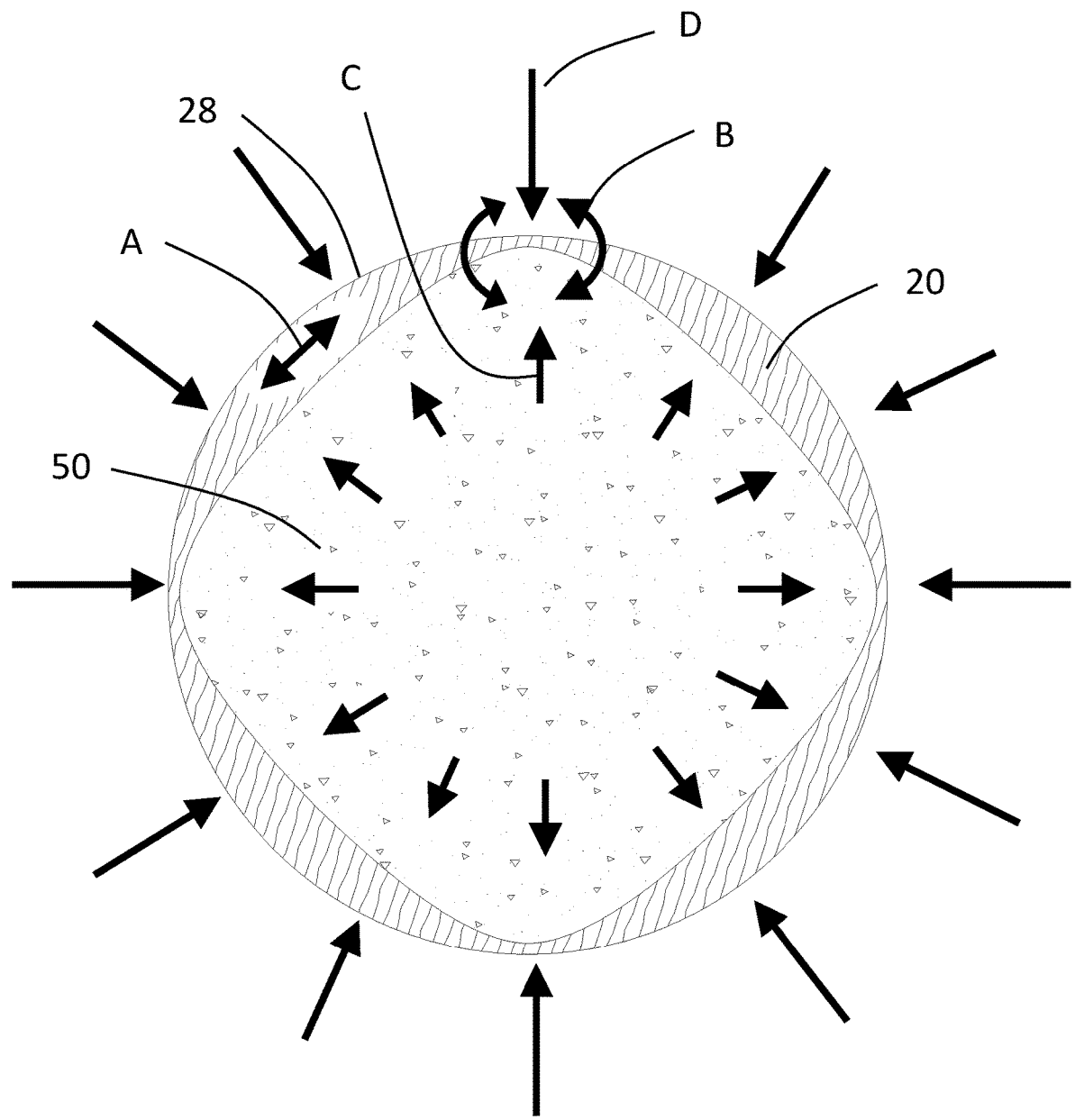
FIG. 4 depicts a cross sectional view of the particle in a second pressurization state.

The third state is realized by using the particles 10 as a nonlinear bulk modulus additive. An external pressure "D" (depicted as inwardly directed arrows in FIG. 4) is applied to the external profile 28. When the particle 10 is in the post manufacture pre-stressed state; application of the external pressure "D" results in the relaxation of the hoop stresses "A" as the external pressure is initially increased. The geometry of the external profile 28 in FIG. 4 initially does not change significantly from that shown in FIG. 3 during this increase in the external pressure "A".

The volumetric change of the particle 10 in response to incremental increases in external pressure is governed by the elastic modulus of the shell 20 as the hoop stresses "A" are relaxed. As the external pressure "D" increases and the external pressure approaches that of the internal pre-pressurization; the hoop stresses "A" decrease and two other mechanisms are employed that control shell compression rates.

The first mechanism is relaxation of the bending stresses "B" in the shell 20 and deformation stresses in the core 50. If the core material 52 is a liquid or gas; the second mechanism is resistance of the core 50 to further compression by compressibility of the core material. If the core material 52 is a solid, the second mechanism is resistance of the core 50 to further compression by compressibility of the core material and to geometric changes due to applied geometric strain.

Figure 5:
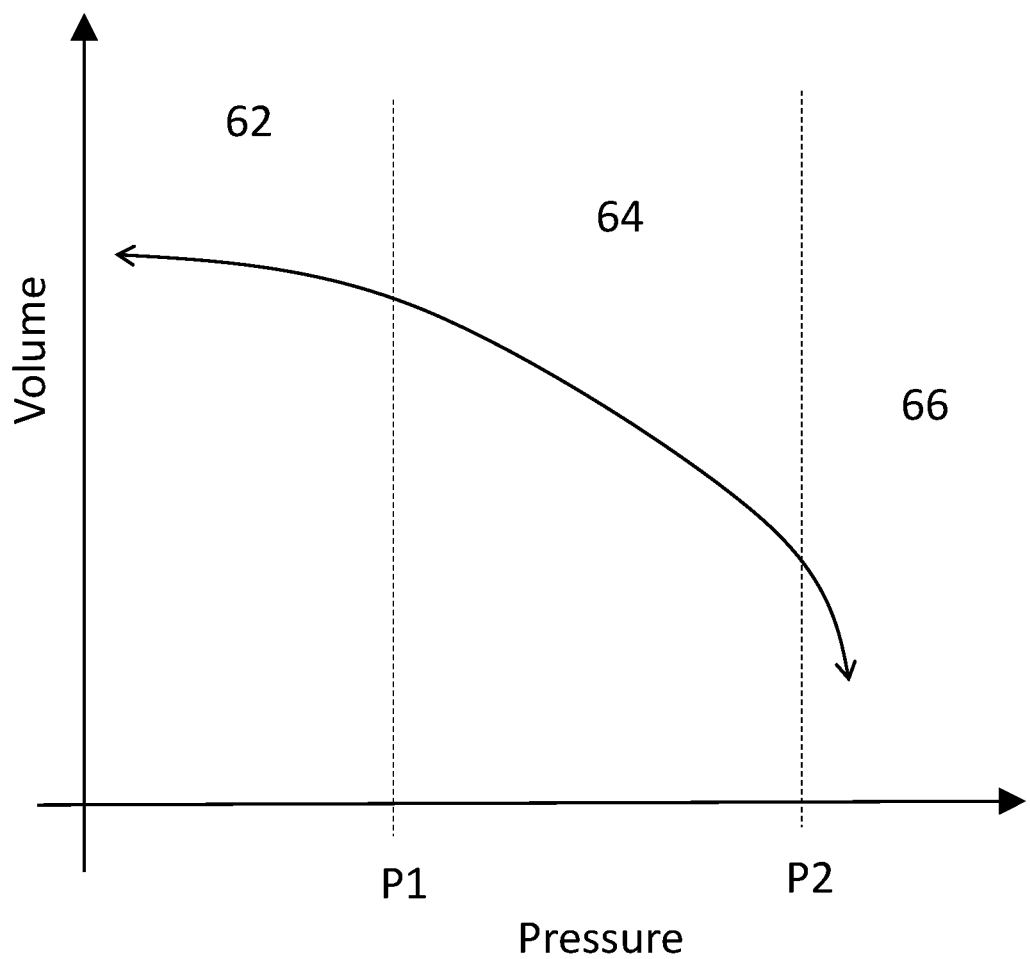
FIG. 5 depicts the variation of volume with external pressure of the particle.

The volume of the particles 10 during compressing by applied the external pressure "A" is illustrated in FIG. 5. In the figure, the volume of particles 10 plots as a function of the applied external pressure "A". As the external pressure "A" increases from ambient pressure; three behavioral regimes are realized.

A first regime 62 occurs when external pressure is between ambient pressure and the pre-pressurization level of the core 50, with the external pressure noted as P1 on the horizontal axis of FIG. 5. In the first regime, the rate of change of particle volume with increased pressure is small. In this regime, the particle 10 is stiff.

The second regime 64 is a transitional regime that is realized after the external pressure exceeds the core pre-pressurization level P1 and approaches the operational pressure, noted as P2. In this transitional regime, the shell 20 begins to deform and the core 50 begins to compress.

A third regime 66 occurs above P2 when the shell 20 deforms to an unloaded state and further shell compression is resisted by compression of the core material 52. In this final state, the particles 10 compress in a manner similar to if the core material 52 were in isolation without a shell 20. In this third regime, the rate of change of particle volume with increased applied external pressure "A" is large, relative to the rate of change of particle volume with increased pressure in the first regime.

Figure 6:
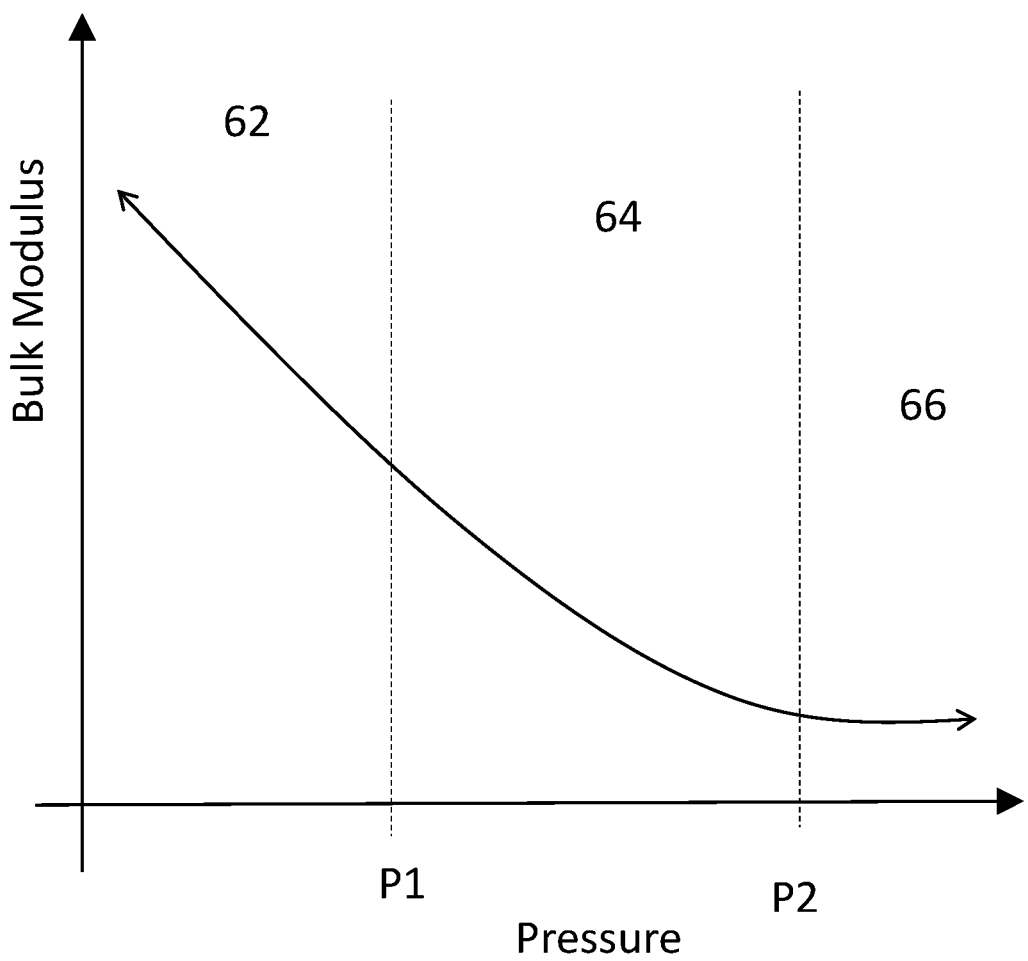
FIG. 6 depicts the variation of effective bulk modulus with external pressure of the particles.

FIG. 6 is a graph depicting the bulk modulus of the particle 10 over the same pressure range as the pressure range depicted in FIG. 5 and illustrating behavior of the nonlinear bulk modulus.

Multiple methods are available to manufacture and pre-pressurize the particles 10. The particles 10 can be produced by segmenting feed stock having a desired cross section and composition.

Figure 7:
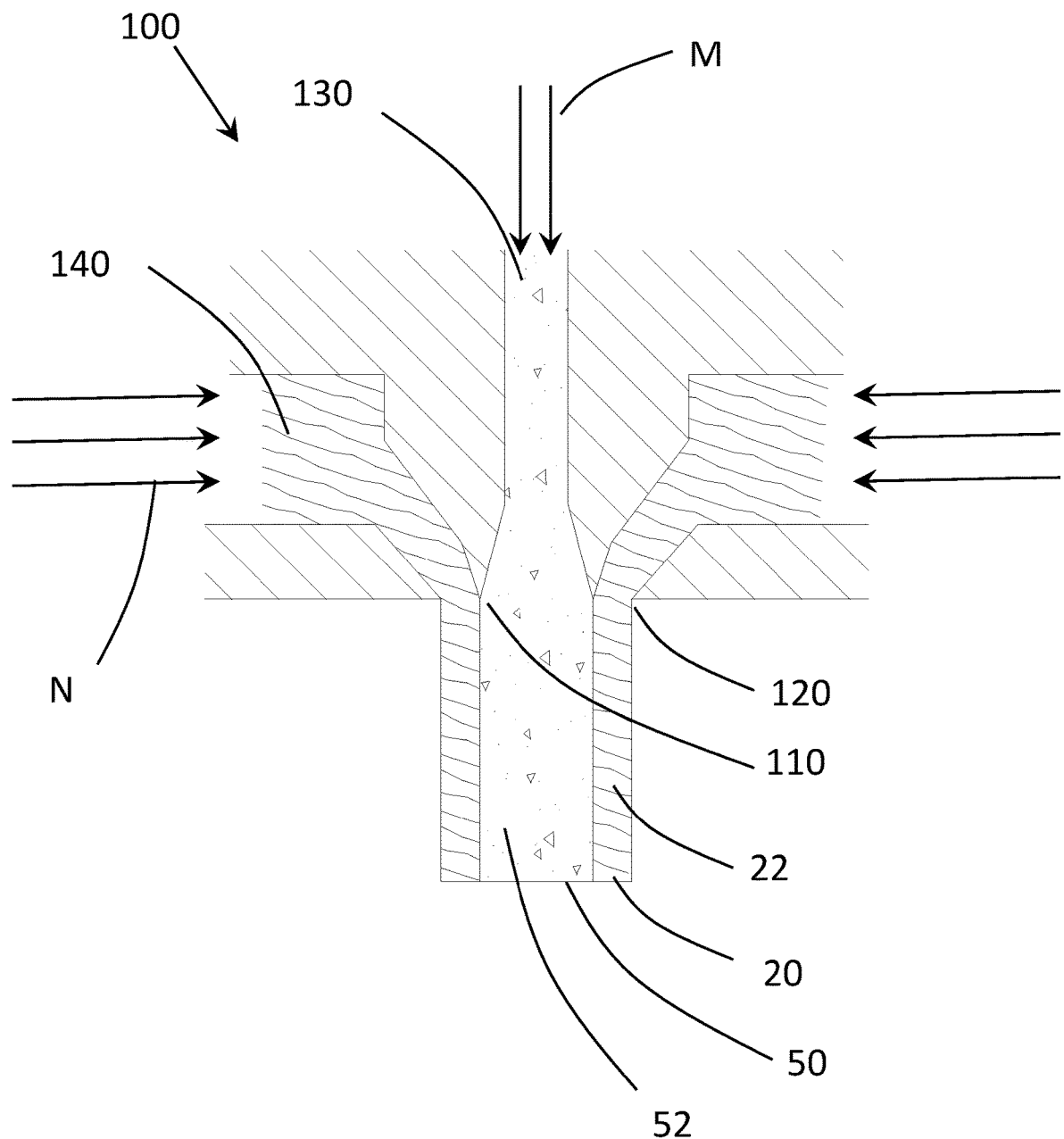
FIG. 7 depicts an extruder.

FIG. 7 depicts a cross section of an annular extruder 100 that can produce stock material having a cross section as shown in FIG. 2. Annular extruders are well known in the art to produce tubing having specified internal and external profiles. The illustrated annular extruder 100 includes a nested central aperture 110 and annular aperture 120, a first supply flow "M" of the core material 52 and a second supply flow "N" of the shell material 22. The central aperture 110 has a profile matching the internal profile 24 and also serves as the internal profile of the annular aperture 120. The annular aperture 120 has an external profile matching the shell external profile 28.

Lengths of the shell 20 are produced by forcing the shell material 22 through the annular extruder 100 at high pressure. The core material 52 is simultaneously forced at high pressure through the central aperture 110 and is injected into the shell 20. Cold extrusion and hot extrusion processes are both suitable for the production process of the shell 20.

In a hot extrusion process, the core material 52 and the shell material 22 are injected at elevated temperatures to increase material plasticity and to reduce the pressure required for extrusion. However, if the shell material 22 is injected at elevated temperatures associated with reduced tensile strength; the core material 52 must not be forced into the interior of the shell 20 at elevated pressures. Elevated core pressure after extrusion into the thermally weakened shell 20 may result in a permanent deformation of the shell.

In a cold extrusion process, the core material 52 and the shell material 22 are forced through the central aperture 110 and the annular aperture 120 at sufficiently high pressures for the shell and core to be formed by plastic deformation at ambient temperatures. If the shell 20 is fabricated using the cold extrusion process; the shell will emerge from the extruder 100 with uncompromised structural properties; thereby, permitting the core material 52 to be injected at elevated pressures into the shell at the extruder exit without damaging the shell to produce a pressurized tube at the exit of the extruder without the risk of structural failure of the shell.

FIG. 8 through FIG. 17 depict a combined extrusion and pressurization system 200 suitable for creation and pressurization of the particles 10 by employing a mechanical method to achieve pre-pressurization. The system 200 includes an annular extruder 202, a first pair of crimping wheels 204 with radial protrusions 206 on each crimping wheel and a plurality of welders 208 with one welder on each protrusion of each crimping wheel.

The system also includes a second pair of crimping wheels 210 with radial protrusions 212 on each crimping wheel and a plurality of welders 214 on each protrusion of each crimping wheel as well as a pair of cutting wheels 216 with a plurality of cutting knives 218.

The first pair of crimping wheels 204 rotate about their respective central axes by a rotational means 220. The second pair of crimping wheels 210 rotate about their respective central axes by a rotational means 222. The cutting knives also have a rotational means 224.

The rotational means 220 can index the rotation of the crimping wheels 204 at a continuous rotation rate or at a rotational rate which varies with angular position, to account for variation in advancement of the feed stock of the shell 20 and the core 50. Radial protrusions 206 affix to the circumference of the crimping wheels 204.

The first pair of crimping wheels 204, the second pair of crimping wheels 210, and the cutting wheels 216 are positioned in a single plane and are oriented with centers of rotation perpendicular to the plane. Also, the first pair of crimping wheels 204, the second pair of crimping wheels 210, and the cutting wheels 216 are positioned opposite each other relative to a central line of symmetry 600 with each pair separated about the line of symmetry with a gap between their respective circumferences and protuberences. Additionally, the first pair of crimping wheels 204, the second pair of crimping wheels 210, and the cutting wheels 216 position in sequence along the line of symmetry 600 with suitable spacing for clearance between to allow rotation without interference.

Figure 8:
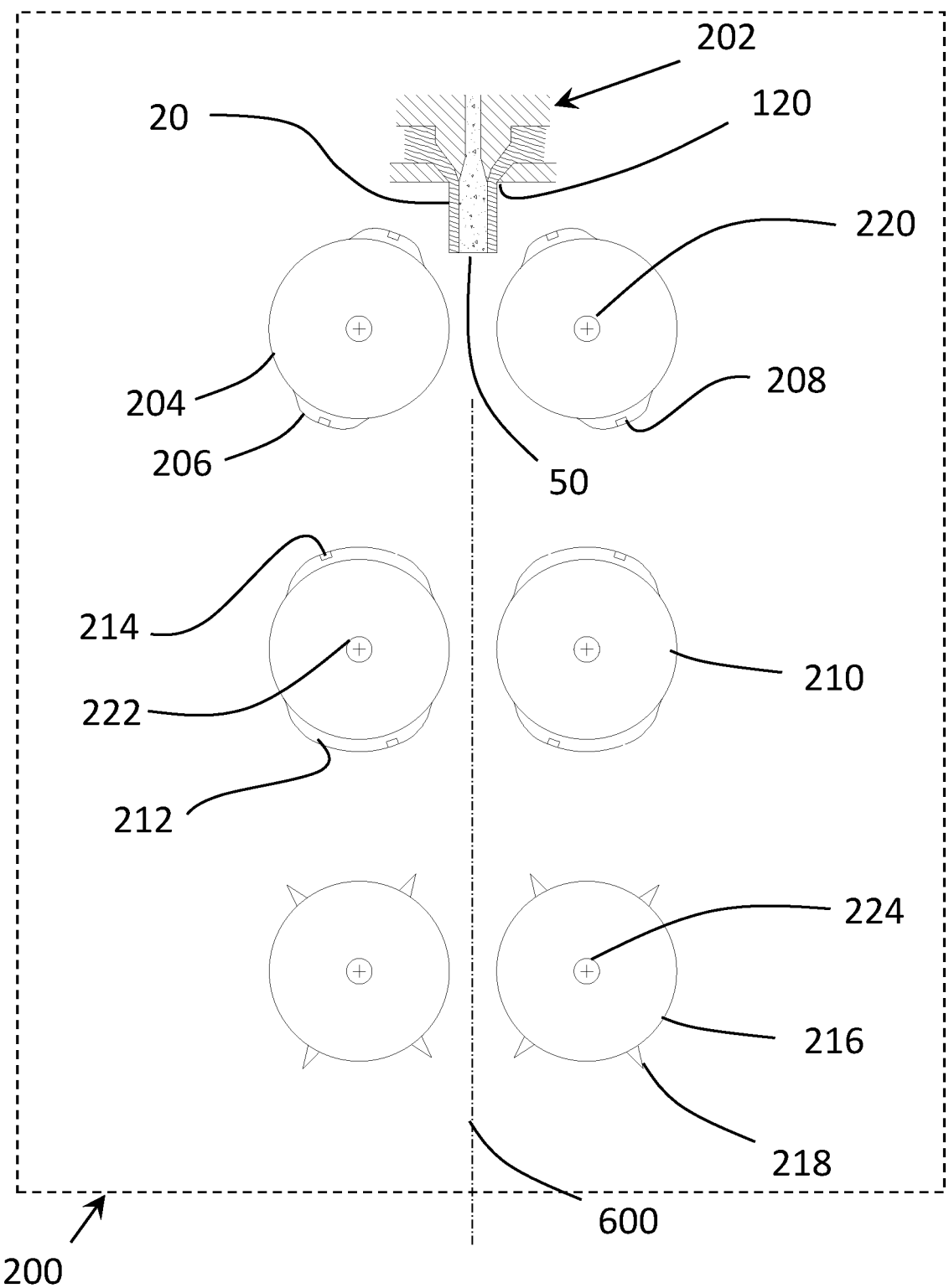
FIG. 8 depicts a system to produce pressurized particles with extruded material in a first position.

As depicted in FIG. 8, the extruded shell 20 with the core 50 is produced at the annular extruder 202. The continuous feed of the shell 20 and core material 52 travel toward the first pair of crimping wheels 204 along the line of symmetry 600. The continuous feed of the shell material 22 can be supplied from a stored source instead of the extruder 202.

Figure 9:
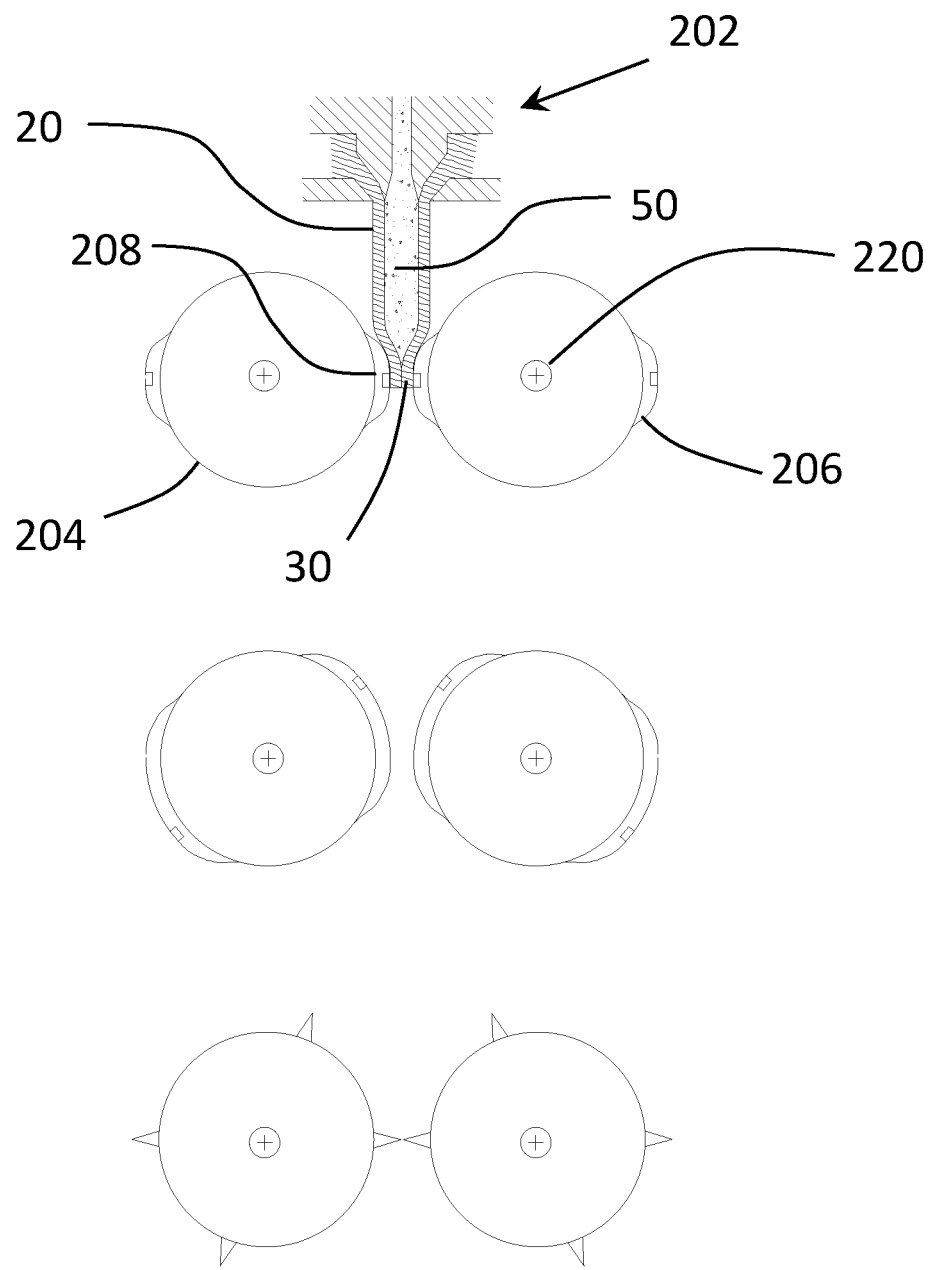
FIG. 9 depicts the extruded material in a second position.

As depicted in FIG. 9, the extruded shell 20 with the core 50 crimps when the shell reaches the crimping wheels 204. As the crimping wheels 204 rotate, positioning of the first set of radial protrusions 206 reduces the space between the crimping wheels during rotation. The shell 20 is positioned between the crimping wheels 204 and is compressed as the crimping wheels rotate. The shell 20 and core 50 are simultaneously advanced by frictional forces between the shell and the crimping wheels 204. This process creates a first portion of a crimped and sealed shell material 22.

If the shell material 22 is metal or thermoplastic; the shell 20 is sealed with welding. The welders 208 are integrated into the protrusions 206. During rotation of the crimping wheels 204, the welders 208 align on opposite sides of the crimped section of the shell 20. At this point in the rotation of the crimping wheels 204; electrical current (in the case of metal shell material) or heat (in the case of thermoplastic shell material) passes between opposing welders 208. The current (arc welding) or heat (thermal welding) welds and seals the crimped shell 20.

Figure 10:
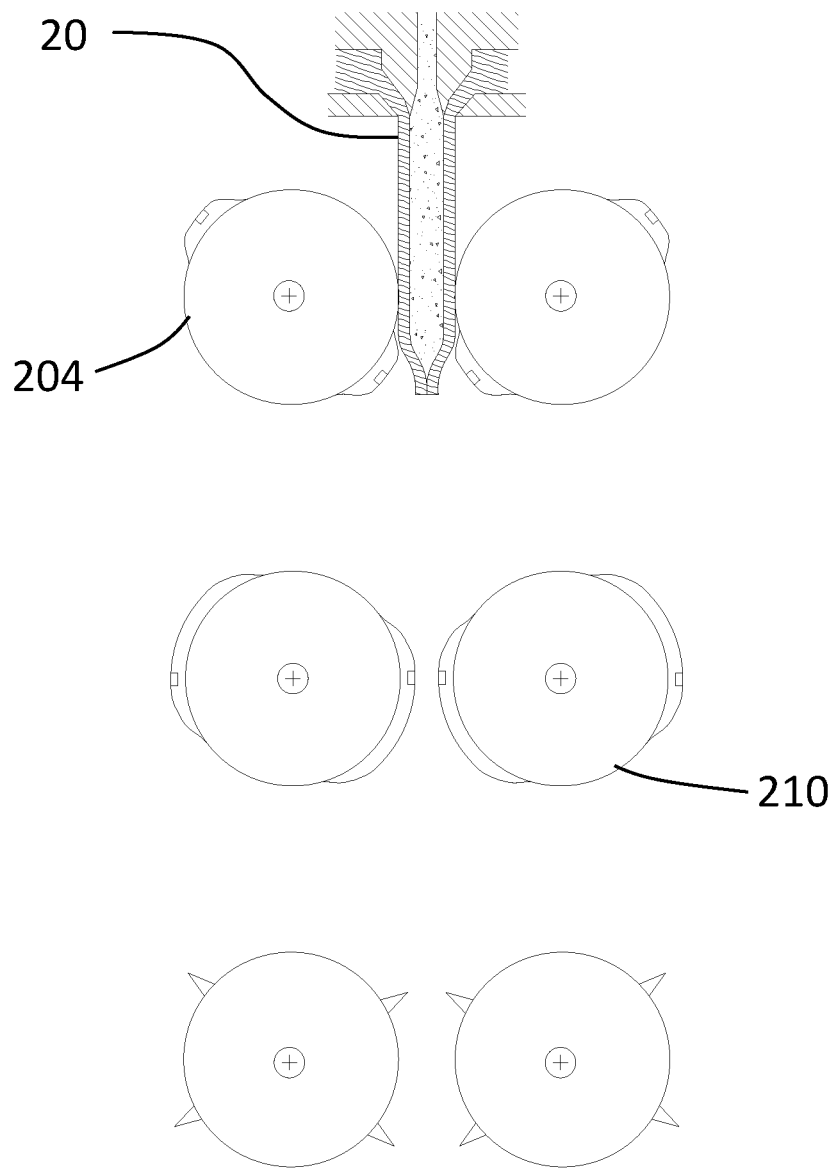
FIG. 10 depicts the extruded material in a third position.
Figure 11:
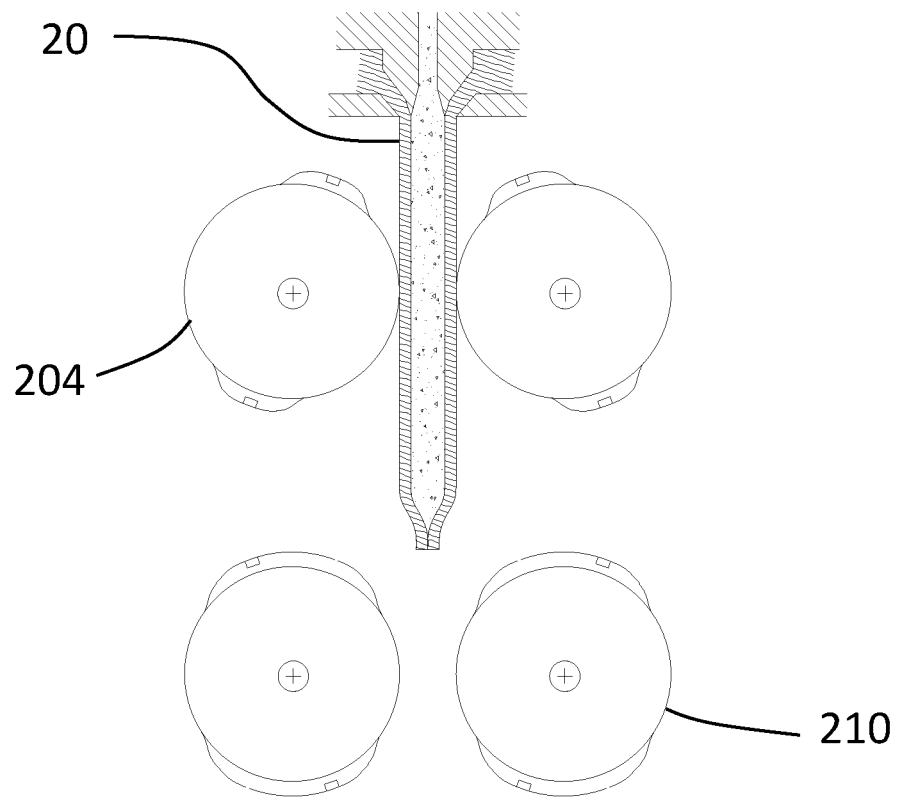
FIG. 11 depicts the extruded material in a fourth position.

As depicted in FIG. 10 and FIG. 11, after the shell 20 has been crimped and welded at the first set of crimping wheels 204; frictional forces between the crimping wheels and the shell advance the shell toward the second set of crimping wheels 210.

Figure 12:
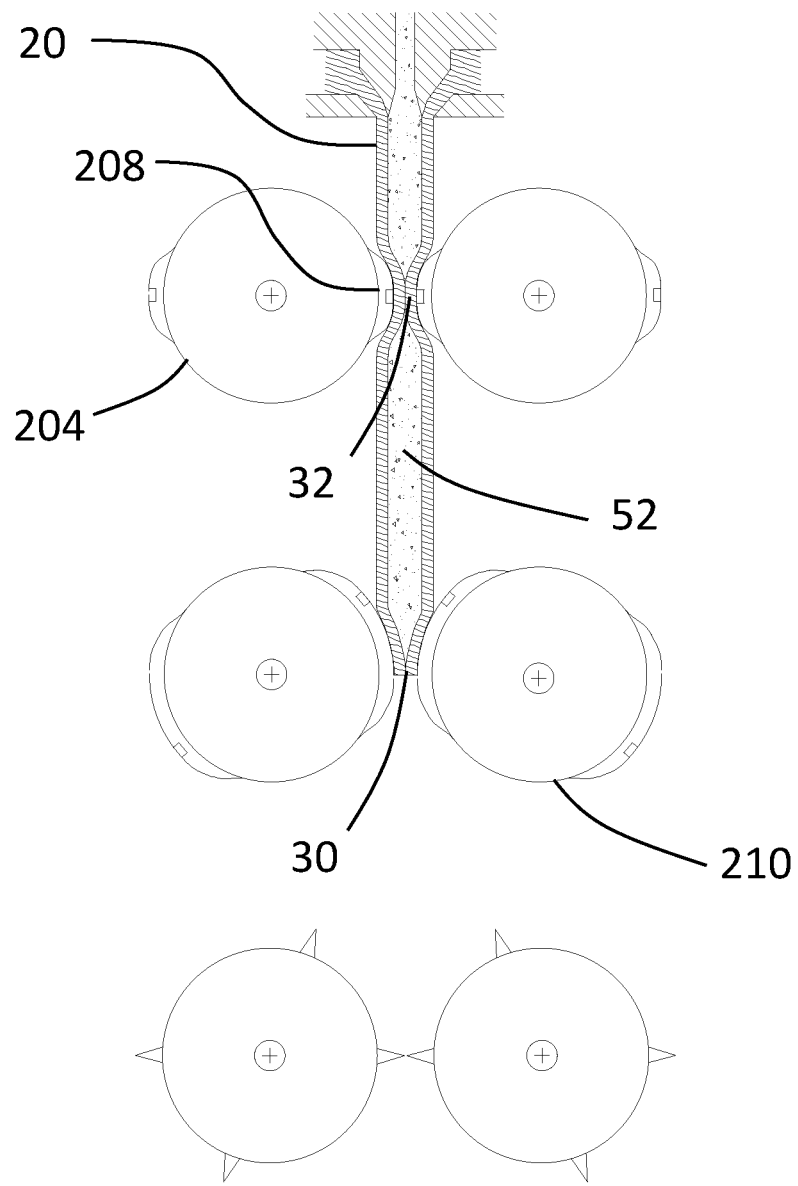
FIG. 12 depicts the extruded material in a fifth position.

As depicted in FIG. 12, when a first portion of the crimped and sealed shell material 22 reaches the second set of crimping wheels 210 and the first set of crimping wheels 204; the second set of crimping wheels engages the shell 20. The first set of crimping wheels 204 close a section of the shell 20 by creating a second portion of crimped and sealed shell material. Crimping at the second set of crimping wheels 210 creates a trapped volume of the core material 52. The first set of welders 208 seals the trapped volume of the core material 52.

Figure 13:
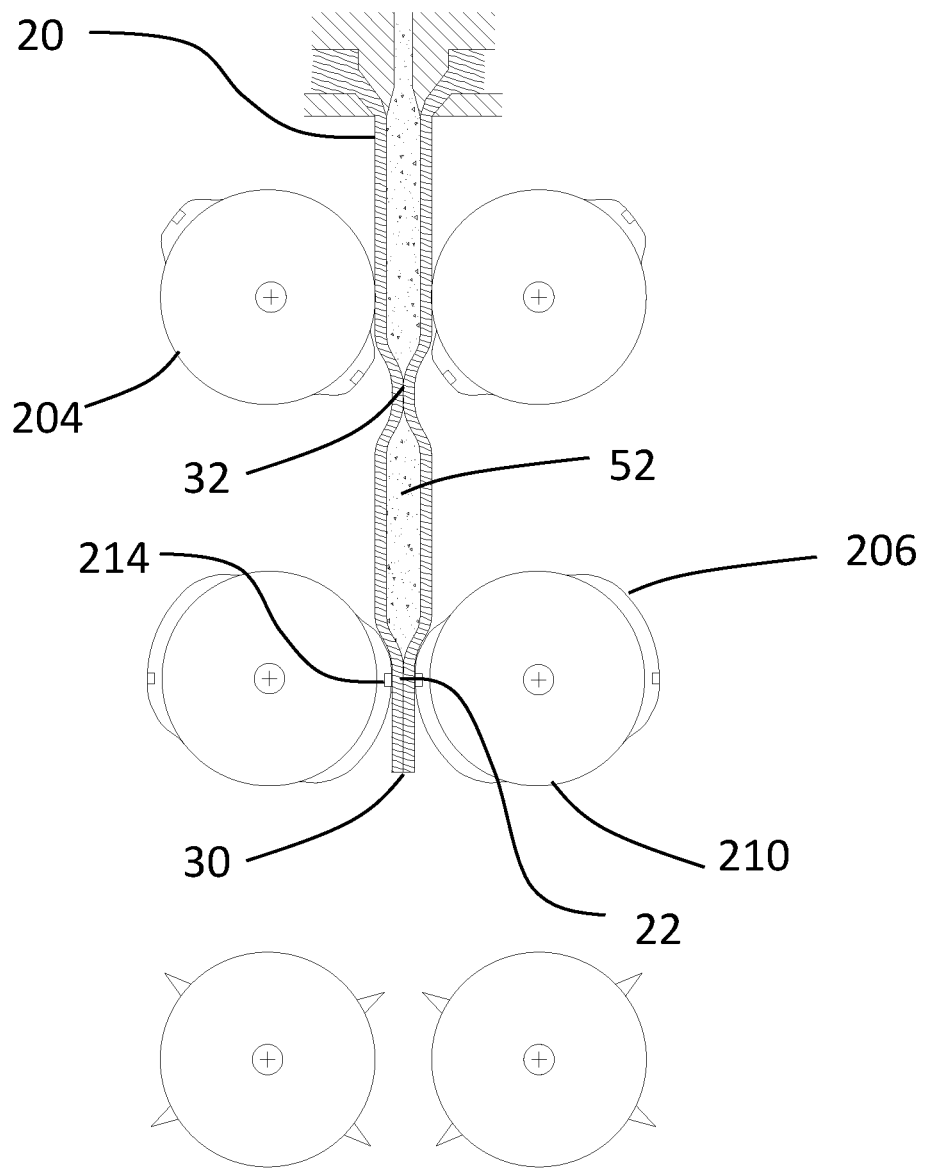
FIG. 13 depicts the extruded material in a sixth position.

As depicted in FIG. 13, as the first set of crimping wheels 204 and the second set of crimping wheels 210 continue to rotate; the shell 20 is advanced and the second set of crimping wheels compresses the forward end of the trapped volume of core material 52 as the radial protrusions 212 are rotate into a position and compress the shell. The compression of the forward end of the trapped volume of core material 52 results in a reduction in the volume of the shell 20 and pressurization of the core 50.

The second set of welders 214 in the radial protrusions 212 of the second set of crimping wheels 210 seal the trapped volume of the core material 52 at a third portion of the crimped and sealed shell material 22.

Figure 14:
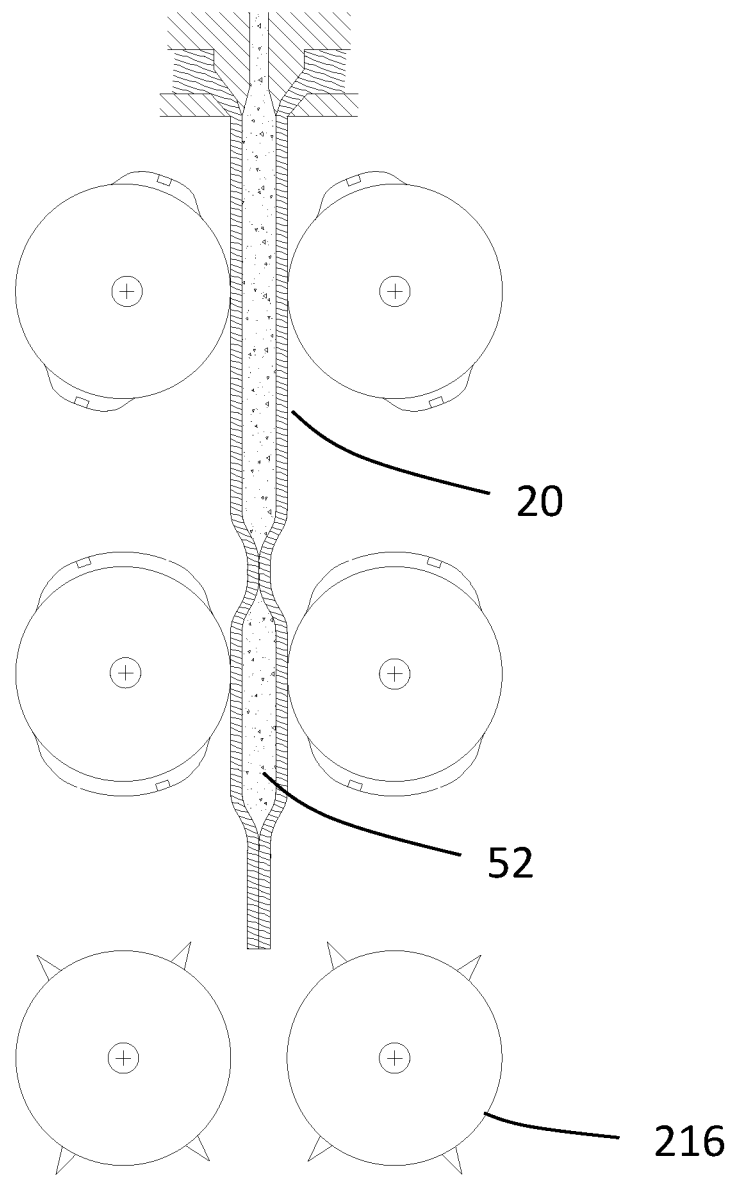
FIG. 14 depicts the extruded material in a seventh position.

As depicted in FIG. 14, after the trapped volume of core material 52 forms within the shell 20; frictional forces between first set of crimping wheels 204 and the shell and between second set of crimping wheels 210 and the shell advance the shell toward the cutting wheels 216.

Figure 15:
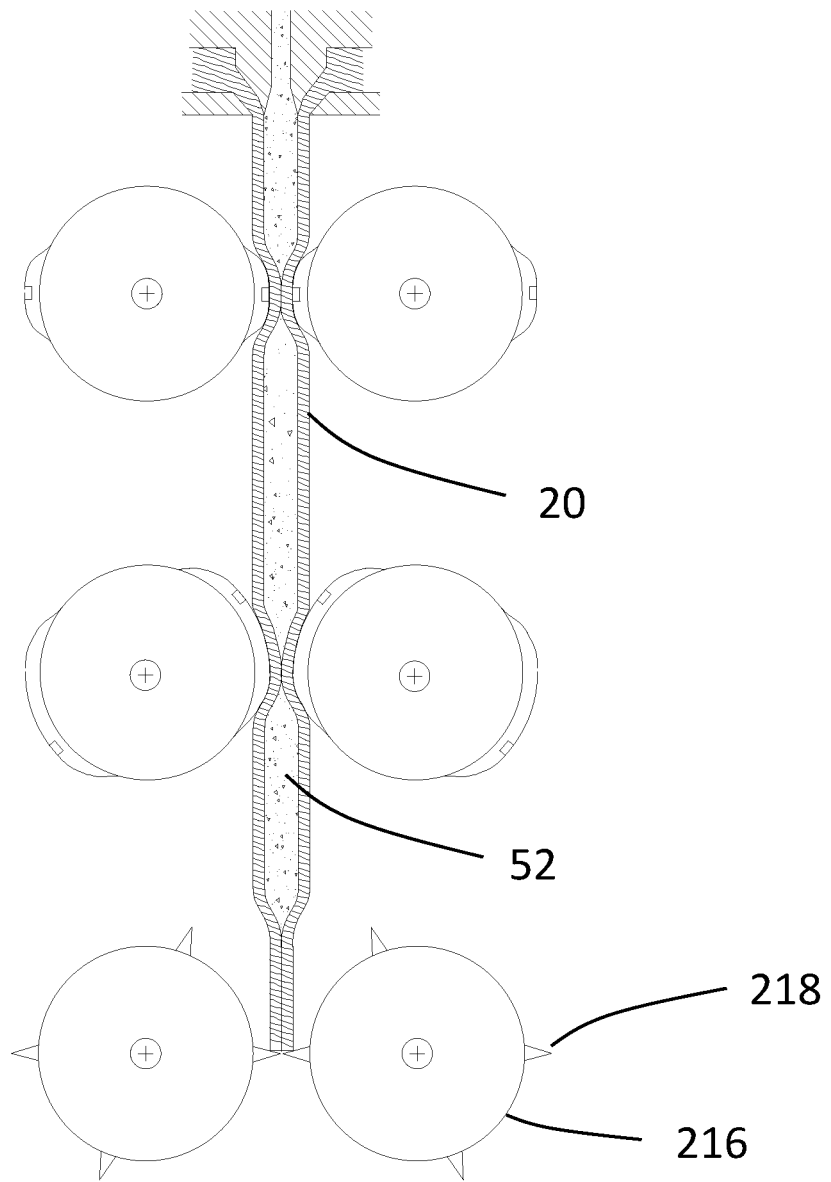
FIG. 15 depicts the extruded material in a eighth position.

As depicted in FIG. 15, when the trapped volume of the core material 52 reaches the cutting wheels 216, the first pair of opposing cutting knives 218 cuts the shell 20 at a first location behind the volume of trapped core material.

Figure 16:
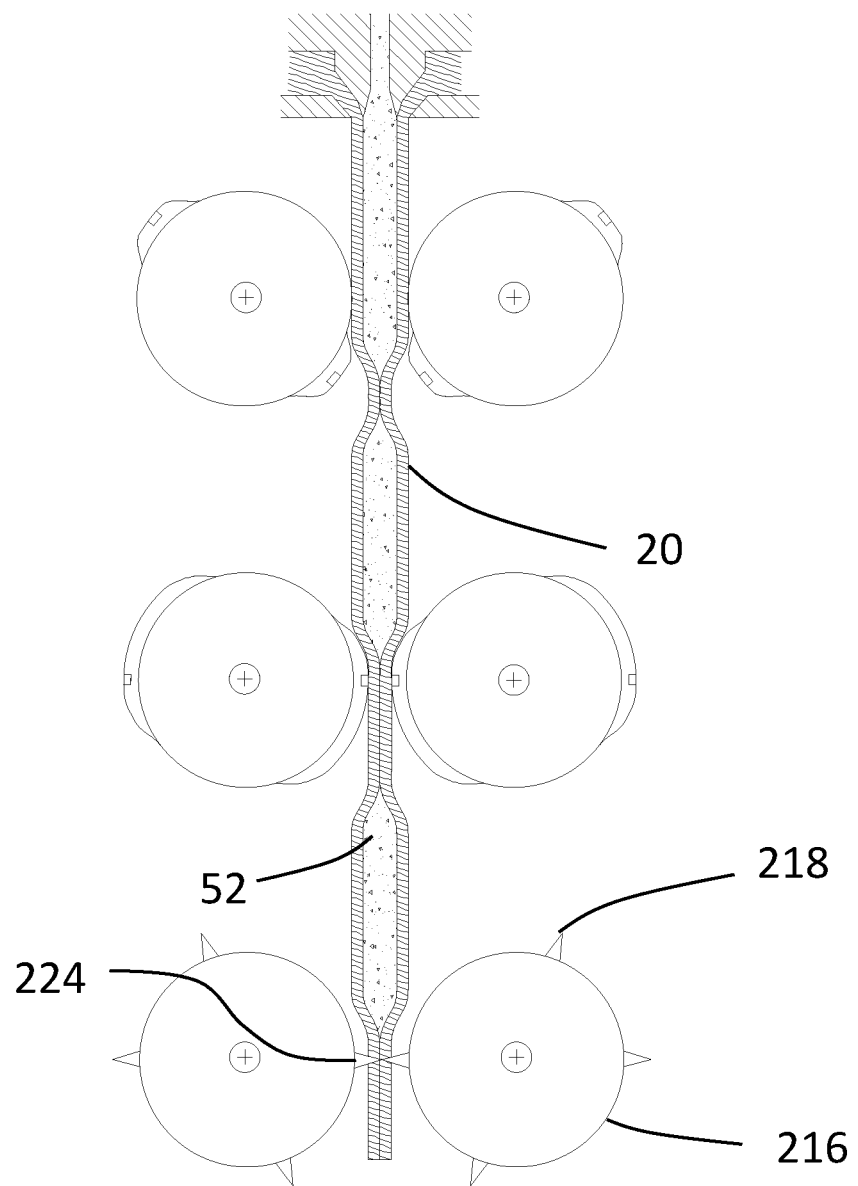
FIG. 16 depicts the extruded material in a ninth position.

As depicted in FIG. 16, when the trapped volume of core material 52 advances to where a third portion of crimped and sealed shell material 22 is axially positioned in alignment with the cutting wheels 216; the second pair of opposing cutting knives 224 cuts the shell 20 at the position of the third portion of crimped and sealed shell material.

Figure 17:
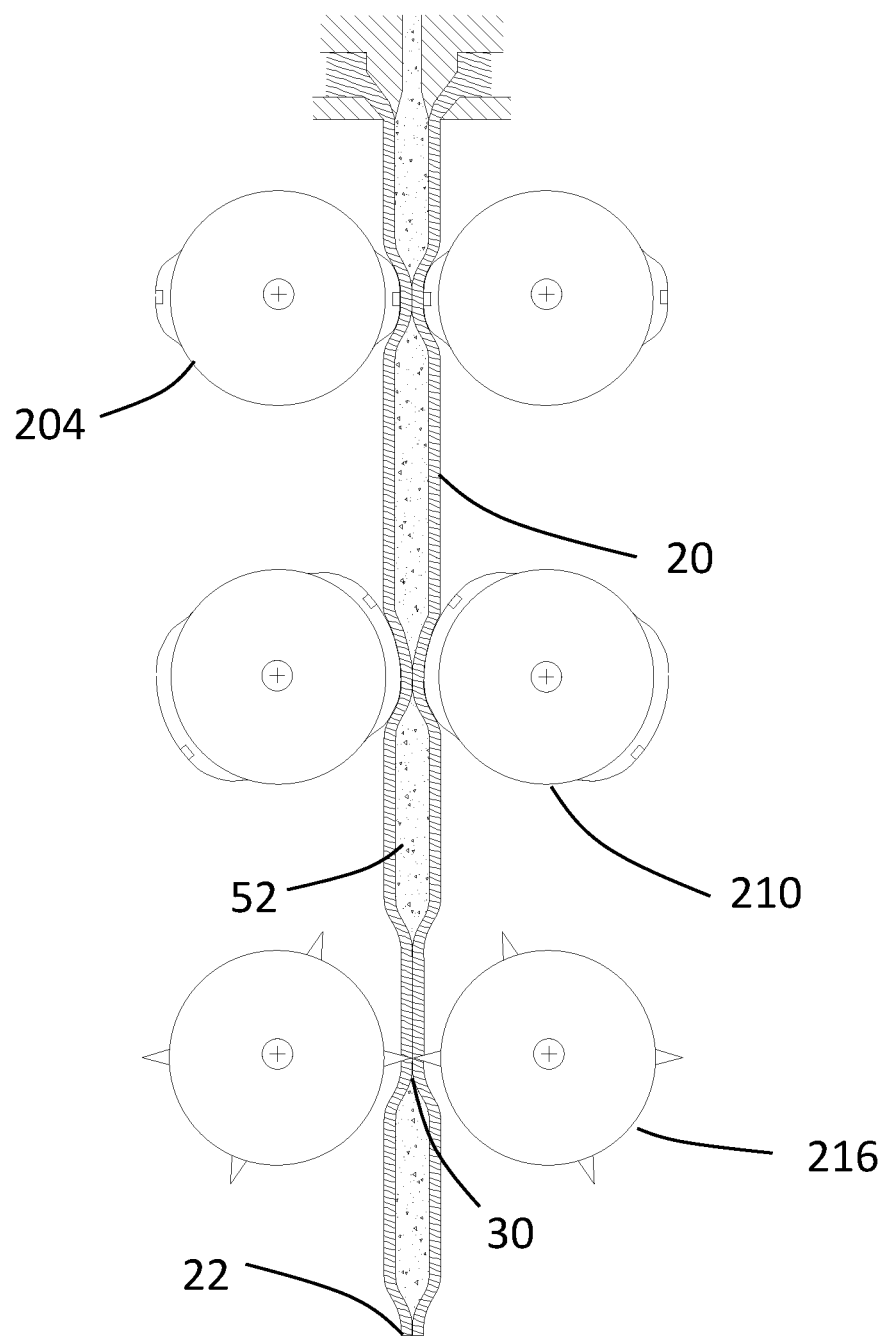
FIG. 17 depicts the extruded material in a tenth position.

As depicted in FIG. 17, as the first pair of crimping wheels 204, the second pair of crimping wheels 210 and the cutting wheels 216 rotate; the shell 20 is advanced. The first pair of crimping wheels 204 crimp and weld the shell 20 at regular intervals. The second pair of crimping wheels 210 crimp, compress, and weld the shell 20 also at regular intervals.

The cutting wheels 216 cut the shell 20 at the position of the third portion of crimped and sealed shell material 22 and at the position of the first portion of the shell material that form sections of volumes of the trapped core material 52. Once the particles 10 are fabricated in quantity, the particles can be embedded in a matrix binder, such as polyethylene, randomly or in a uniform pattern.

In light of the above, it is therefore understood that within the scope of the appended claims, the invention may be practiced otherwise than as specifically described.

What is claimed is:

1. A particle having a bulk modulus that varies nonlinearly with changes in pressure, said particle comprising:
   a solid elastic shell having a tube shape with a closure at both ends and a wall with a circumferentially varying thickness defined by an inner surface and an outer surface; and
   a core as an entirety of a closed volume defined by the inner surface of said shell, with said core having a bulk modulus less than the bulk modulus of said shell.

2. The particle in accordance with claim 1, wherein said core is solid.

3. The particle in accordance with claim 1, wherein said core is a liquid.

4. The particle in accordance with claim 1, wherein said core is a gas.

5. A system for fabricating particles comprising:
   a first pair of crimping wheels with centers of rotation and a means of rotation, said crimping wheels having a plurality of radial protrusions equally spaced around a circumference of each crimping wheel and a welder on each protrusion of each said crimping wheel;
   a second pair of crimping wheels operationally connected with said first pair of crimping wheels, said second pair of crimping wheels having centers of rotation and a means of rotation as well as a plurality of radial protrusions equally spaced around the circumference of each crimping wheel of said second pair of crimping wheels and welders on each protrusion of each crimping wheel of said second pair of crimping wheels; and
   a pair of cutting wheels operationally connected with said second pair of crimping wheels, said cutting wheels having centers of rotation and a means of rotation with said cutting wheels including a plurality of cutting knives equally spaced around the circumference of each said cutting wheel;
   wherein said means of rotation for said first crimping wheels, said second crimping wheels, and said cutting wheels independently controls the rotational speed and rotational angle for said first crimping wheels, said second crimping wheels, and said cutting wheels;
   wherein said first crimping wheels, said second crimping wheels, and said cutting wheels lie in a single plane and are oriented with centers of rotation perpendicular to the plane;
   wherein said first crimping wheels are positioned with centers of rotation equidistant from a central line lying in the plane such that a distance between the centers of rotation of the crimping wheels in said first crimping wheels is greater than twice the radius of one of said first crimping wheels plus twice the height of said protuberances on said first crimping wheels;
   wherein said second pair of crimping wheels are positioned with centers of rotation equidistant from the central line lying in the plane such that a distance between the centers of rotation of the crimping wheels in said second pair is greater than twice the radius of one of said second crimping wheels plus twice the height of said protuberances on said second crimping wheels;
   wherein said pair of cutting wheels are positioned with centers of rotation equidistant from the central line lying in the plane such that a distance between the centers of rotation of the cutting wheels is greater than twice the radius of one of said cutting wheels plus twice the height of said protuberances on said second crimping wheels.

6. The system in accordance with claim 5, wherein said welders are electric arc welders.

7. The system in accordance with claim 5, wherein said welders are thermal welders.

* * * * *